US009208629B2

(12) United States Patent
Saladin et al.

(10) Patent No.: US 9,208,629 B2
(45) Date of Patent: Dec. 8, 2015

(54) GARAGE DOOR OPEN ALERT

(71) Applicant: Continental Automotive Systems, Inc., Auburn Hills, MI (US)

(72) Inventors: Peter Saladin, Palatine, IL (US); Michael Daleki, Addison, IL (US); Thomas Brey, Lake In the Hills, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/528,677

(22) Filed: Oct. 30, 2014

(65) Prior Publication Data

US 2015/0084779 A1    Mar. 26, 2015

Related U.S. Application Data

(63) Continuation-in-part of application No. 13/663,628, filed on Oct. 30, 2012.

(51) Int. Cl.
*B60R 25/00* (2013.01)
*G07C 9/00* (2006.01)
*H04W 4/02* (2009.01)
*E05F 15/77* (2015.01)

(52) U.S. Cl.
CPC ............ *G07C 9/00896* (2013.01); *E05F 15/77* (2015.01); *H04W 4/02* (2013.01); *E05Y 2400/32* (2013.01); *E05Y 2400/51* (2013.01); *E05Y 2400/80* (2013.01); *E05Y 2900/106* (2013.01); *G07C 2009/00928* (2013.01)

(58) Field of Classification Search
CPC ............................................. G07C 2009/00928
USPC ............... 340/5.7–5.71, 539.13, 539.14, 435, 340/426.15, 426.33
See application file for complete search history.

(56) References Cited

U.S. PATENT DOCUMENTS

| | | | |
|---|---|---|---|
| 7,196,623 B1 * | 3/2007 | Wang | 340/540 |
| 7,602,283 B2 * | 10/2009 | John | 340/539.11 |
| 7,650,864 B2 * | 1/2010 | Hassan et al. | 123/179.2 |
| 8,115,616 B2 * | 2/2012 | Gonzaga | 340/457 |
| 8,626,356 B2 * | 1/2014 | Davis et al. | 701/2 |
| 8,643,467 B2 * | 2/2014 | Chutorash et al. | 340/5.71 |
| 2008/0240051 A1 * | 10/2008 | Nagy et al. | 370/338 |
| 2009/0189779 A1 * | 7/2009 | Gao | 340/901 |
| 2011/0030638 A1 * | 2/2011 | Newman | 123/179.2 |
| 2014/0118111 A1 * | 5/2014 | Saladin et al. | 340/7.51 |

* cited by examiner

*Primary Examiner* — Fekadeselassie Girma
*Assistant Examiner* — Son M Tang

(57) ABSTRACT

A garage door can be detected as being open by sensing various physical conditions the existence of which indicate the garage door as being open. When a door is determined to be open, a notification message is wirelessly transmitted to a predetermined entity or person notifying them that the door is open. Corrective action can then be taken to close the door to keep the vehicle and contents of the garage secure.

10 Claims, 13 Drawing Sheets

GARAGE DOOR OPEN ALERT

RELATED APPLICATIONS

This application is a continuation-in-part of U.S. application Ser. No. 13/663,628 filed Oct. 30, 2012, and entitled, "Determining the State of a Garage Door Using Vehicle Sensors."

BACKGROUND

Most vehicle owners prefer to keep their vehicles in a secured garage, i.e., a garage equipped with an overhead garage door through which the vehicle can be moved into and out of the garage. Most people also prefer such garage doors to be operated by a wirelessly controlled garage door opener.

A relatively common problem with garage doors is that they are sometimes left open inadvertently. Garage doors are often left open because a vehicle operator forgot to close the door or because an obstruction is in the door's path, which inhibits most garage door openers from operating. A garage door detector that is able to determine whether a garage door is open or closed would be an improvement over the prior art. A detector that is also able to communicate the state of the garage door would also enable an owner of the garage or an owner/operator of the vehicle to decide wither corrective action should be taken.

BRIEF SUMMARY

In accordance with embodiments of the invention, a garage door can be detected as being open by sensing various physical conditions the existence of which indicate the garage door as being open. When a door is determined to be open, a notification message may be wirelessly transmitted to a predetermined entity or person notifying them that the door is open. Corrective action may then be taken to close the door to keep the vehicle and contents of the garage secure.

DETAILED DESCRIPTION

Figure 1:
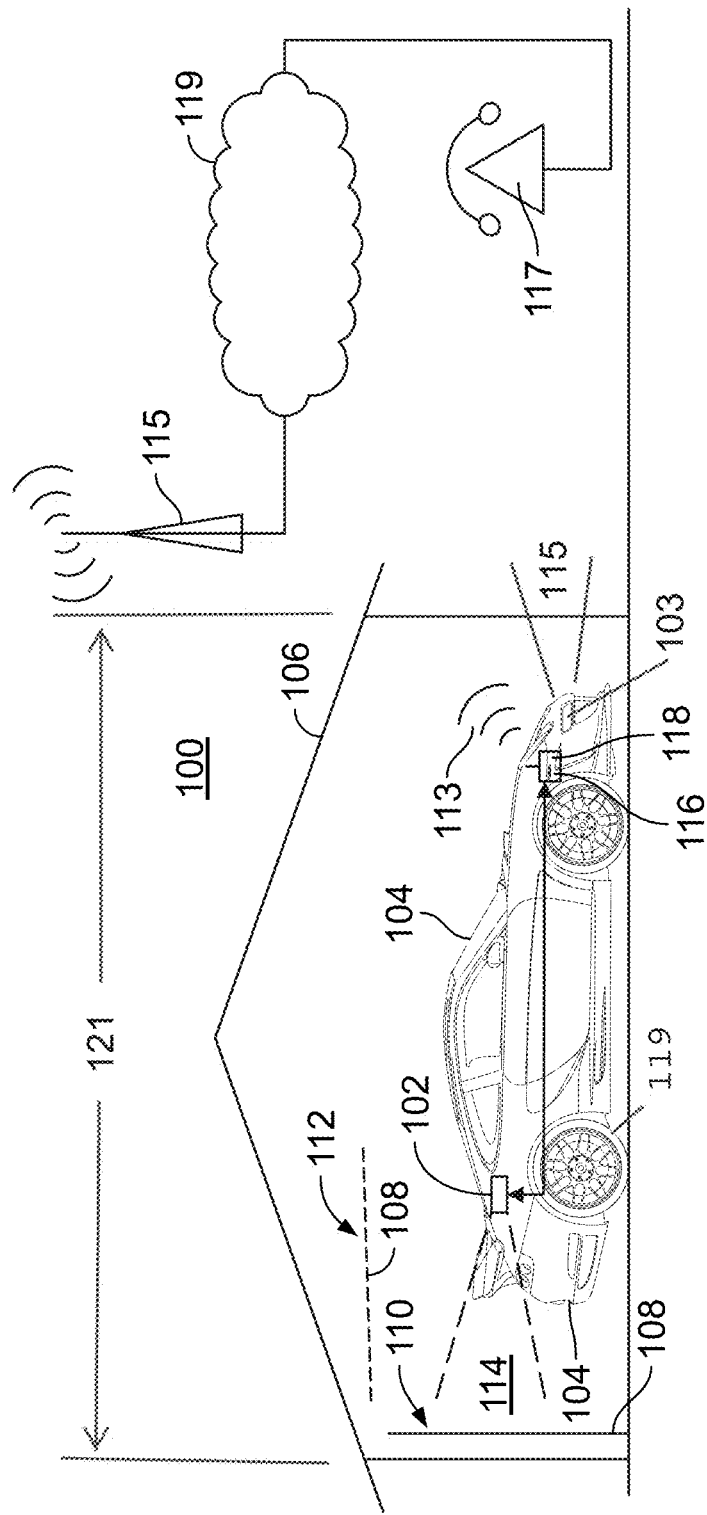
FIG. 1 depicts a first embodiment of garage door position detector.

FIG. 1 depicts a first embodiment of garage door position detector system 100. It also depicts a vehicle 104 that is provided with one or more types of sensors described below.

The detector system 100 shown in FIG. 1 is configured to repeatedly determine the location or status of a garage door, i.e., determine whether a garage door is open, by determining whether the overhead garage door is behind the vehicle 104. In one embodiment, such a determination is made by comparing an image of what is behind the vehicle just after it has been parked to previously-captured images of the garage door 108 when it is both open and closed. In another embodiment, parking sensors are used to determine what is behind the vehicle after the vehicle has been moved inside the garage from a known location outside the garage. Importantly, the detector system 100 is able to determine the status of any garage door for any garage.

If the garage door 108 is determined to be open, the detector system 100 wirelessly transmits an open door notification message. The message can be sent to a predetermined person or entity, such as the vehicle's owner, the garage's owner or some other person or entity, notifying one or more of them that the door is open. Corrective action can then be taken to close the door and secure the vehicle and contents of the garage. In various embodiments, a signal is transmitted automatically to the overhead garage door opener, causing it to close.

The door-open notification message to a person can be embodied as a text message, i.e., a data message or e-mail, or a pre-recorded audio message. The destination or address of the text message or e-mail can be specified in advance, i.e., be predetermined.

The preferred embodiment of the detector system 100 depicted in FIG. 1 comprises a rear parking sensor 102, embodied as either a camera, an ultrasonic/acoustic locator or laser with a laser detector, is attached to the vehicle 104. It has a rearward-directed "field of view" 114, the horizontal length of which is relatively short, i.e., less than about twenty feet, which is a distance substantially equal to the length 121 of most garages, including the garage 106 depicted in the figure. The rear sensor 102 is thus able to "see" or detect objects and surfaces that are within about twenty feet of the sensor 102 and/or within about twenty feet of the rear end of the vehicle 104.

A front parking sensor 103, embodied as either a camera, an ultrasonic/acoustic locator or laser with a laser detector, is attached to the front end of the vehicle 104. It has a forward-directed "field of view" 115, the length of which is relatively short, i.e., less than about twenty feet. The front sensor 103 is thus able to "see" or detect objects and surfaces that are within about twenty feet of the sensor 102 and/or the front end of the vehicle 104, or at least within a distance that is substantially equal to the length 121 of the garage 106.

The parking sensors 103 and 102 are configured to detect an object or surface within their respective fields of view, i.e., the relatively short distance between the rear and front ends of the vehicle 104 and the corresponding sensors 102, 103 and provide an output signal proportional to or representative of the distance between the vehicle front and rear ends and objects in front of and behind the vehicle 104.

The vehicle 104 is depicted in FIG. 1 as being parked inside a garage 106 with a conventional, vertically-operated sectional door 108. The garage door 108 is shown in FIG. 1 in its "down" or closed position 110. The vehicle 104 can be driven into and out of the garage 106 when the door 108 is in its "up" or open position 112.

The door 108 is preferably operated by a conventional, remotely controlled garage door opener mechanism, not shown, but well known to those of ordinary skill in the art. The opener lifts and lowers the garage door 108 responsive to signals transmitted to it from a transmitter, commonly referred to as an opener.

The rear parking sensor 102 is preferably mounted inside the vehicle 104 but nevertheless positioned to be able to capture images or detect objects and/or surfaces in the detector's field of view 114 outside and behind the vehicle 104.

The front parking sensor 103 is also preferably mounted inside the vehicle 104 but nevertheless positioned to be able to capture images or detect objects in the front sensor's field of view 115 that is outside and in front of the vehicle 104.

In embodiments where the sensors 102, 103 are cameras, images of the front and rear parking areas are captured as frames, as is well known. Each frame image comprises multiple individual picture elements or pixels, as is also well known.

The parking sensors 102, 103 are positioned or "configured" to be able to detect objects that are in relative close proximity to the rear and front of the vehicle respectively, i.e., less than about six-twelve feet. A garage wall and the overhead door are considered herein to be "objects" that can be detected by the sensors 102, 103.

The sensors 102, 103 are coupled to and controlled by a processor 116, which executes program instructions stored in non-transitory memory. The processor 116 is also coupled to, and preferably co-located with a wireless transceiver 118.

The transceiver 118 is preferably a radio frequency transceiver provided with a dual-band transmission capability. A dual-band transceiver is able to communicate wirelessly using a cellular network, i.e., transmit and receive on one or more cellular bands. It can also transmit garage door opener control signals on one or of the radio frequency bands commonly used by remote garage door openers.

Since the transceiver 118 is able transmit and receive signals 113 to and from a conventional cellular network 115, it thus able to communicate messages to other devices such as other cell phones and a conventional telephone 117 by way of data and switching networks 119 to which such other devices can be directly or indirectly coupled. The transceiver is also able to send and receive text messages as well as send and receive e-mail messages.

As stated above and as is well known, the rear parking sensor 102 detects objects or captures images in its field of view 114. The front parking sensor 103 also captures images in its field of view 115.

As used herein, a bus is a set of parallel electrical conductors that form a main transmission path. It carries address, control and data to and from a central processing unit (CPU).

Figure 2:
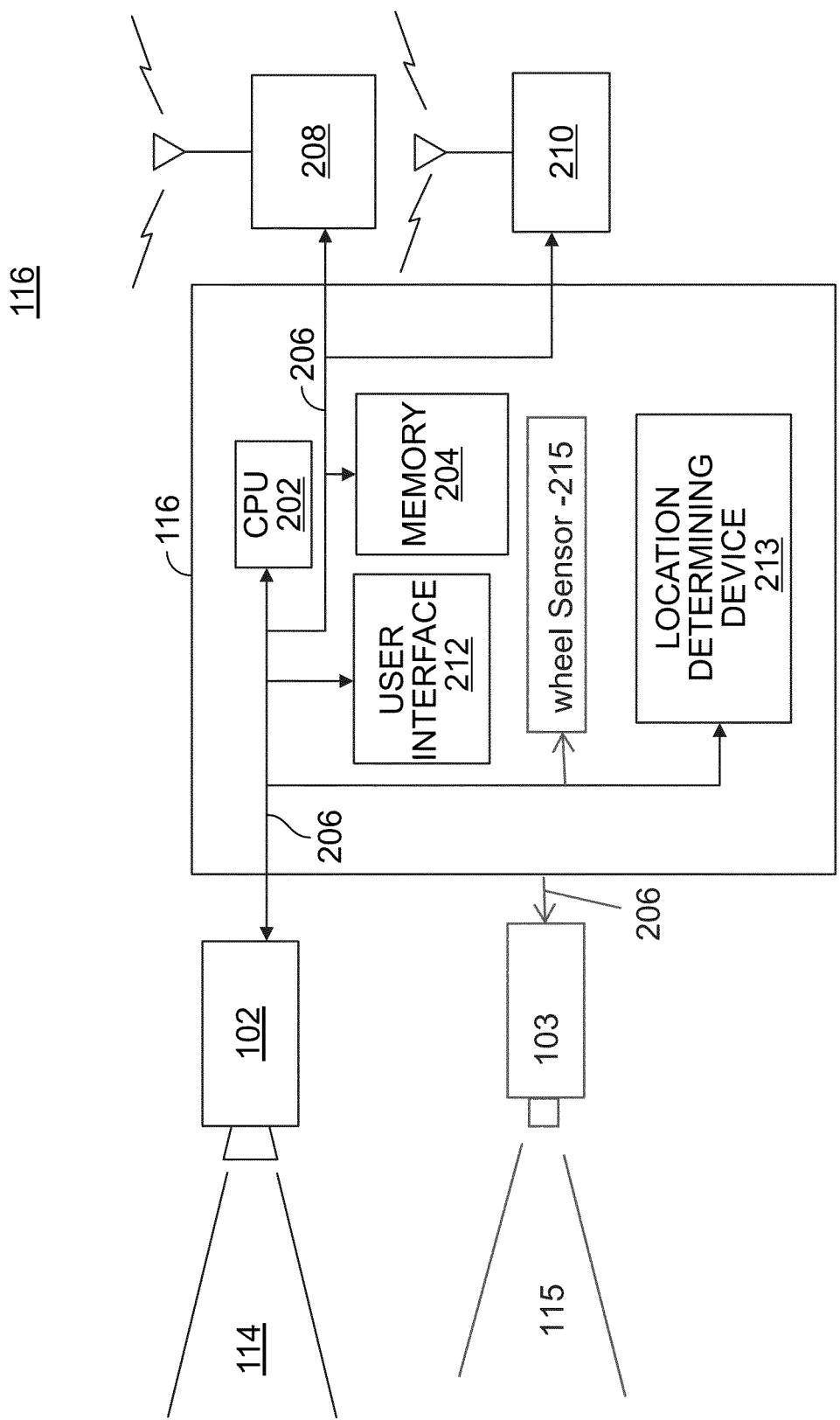
FIG. 2 is a block diagram of a processor for use with various different embodiments of door detectors.

FIG. 2 is a block diagram of the processor 116 used with the parking sensors 102, 103 and used with various door detectors disclosed herein. A central processing unit (CPU) 202, embodied as a conventional microcontroller well known in the art, is coupled to a conventional, non-volatile, non-transitory memory device 204, via a conventional bus 206.

The memory device 204 stores data and executable program instructions for the CPU 202. When instructions in the memory device 204 are executed by the CPU 202, they cause the CPU to exercise control over the parking sensors 102, 103 and other devices coupled to the bus 206 as described herein.

In addition to coupling the CPU 202 to the memory device 204, the bus 206 also couples the CPU 202 to the rear parking sensor 102, the front parking sensor 103, a conventional cellular telephone transceiver 208 and a conventional wireless garage door opener transmitter 210. Other sensors described below are coupled to the CPU 202 in the same way that the rear parking sensor 102 is coupled to the CPU 202.

A location determiner or location determining device 213 is coupled to the CPU 202 via the bus 206. Using the bus 206, the CPU 202 sends instructions to the location determiner 213 and receives data therefrom.

The location determining device 213 is preferably embodied as a global positioning system receiver. Data from the location determining device 213 includes geographic location coordinates. The location determining device 213 and data it provides is used by the CPU 202 to determine where the vehicle is located prior to determining, by the CPU 202, whether a garage door 106 is up or down.

One alternate embodiment of the location determining device 213 includes a cellular telephone radio configured to locate the vehicle by triangulation using signals from nearby towers. Another alternate embodiment is a "WI-FI" receiver and database stored in memory 204 from which the location of the vehicle 104 can be determined if the SSID of a received WI-FI signal corresponds to a WI-FI signal that is received when the vehicle is in the garage.

A wheel sensor 215 is coupled to the CPU 202 via the bus 206. The wheel sensor 215 detects and counts rotations of the vehicle wheels. It sends wheel rotation data to the CPU 202 via the bus 206.

The wheel sensor 215 is preferably the same sensor (or the same kind of sensor) used by the vehicle's anti-lock brakes system. The anti-lock brake system is not shown but such systems well known in the art.

Since the diameter of the vehicle's tires 119 is known in advance and stored in the memory 204, counting the number of wheel revolutions or fractions thereof using data from the wheel sensor 215 enables the CPU 202 to calculate a relatively precise distance travelled by the vehicle 104 simply by multiplying wheel revolutions by the tire 119 circumference. The circumference is of course determined from the tire diameter multiplied by 3·14. The location determiner 213 thus enables the CPU 202 to determine when the vehicle 104 is in front of a garage door. And, as the vehicle rolls into a garage and loses GPS signals, the wheel sensor 215 enables the CPU 202 to determine precisely when the vehicle has rolled a distance that is sufficient to place or locate the vehicle completely inside the garage. The length 121 of the garage 106 is of course known in advance and stored in the memory 204.

A conventional cellular telephone transceiver 208, conventional garage door opener transmitter 210 and a non-transitory memory device 204 are coupled to the CPU 202 via the same bus 206 and controlled by the CPU 202. The transceiver 208, transmitter 210 and memory device 204 are preferably co-located, i.e., within the same housing and/or on the same circuit board, not shown but well known to those of ordinary skill in the art.

A user interface 212 is also coupled to the CPU via the bus 206. It is preferably embodied as a conventional touch-sensitive display panel. It allows input commands to be input to the CPU 202 from a user.

Figure 3A:
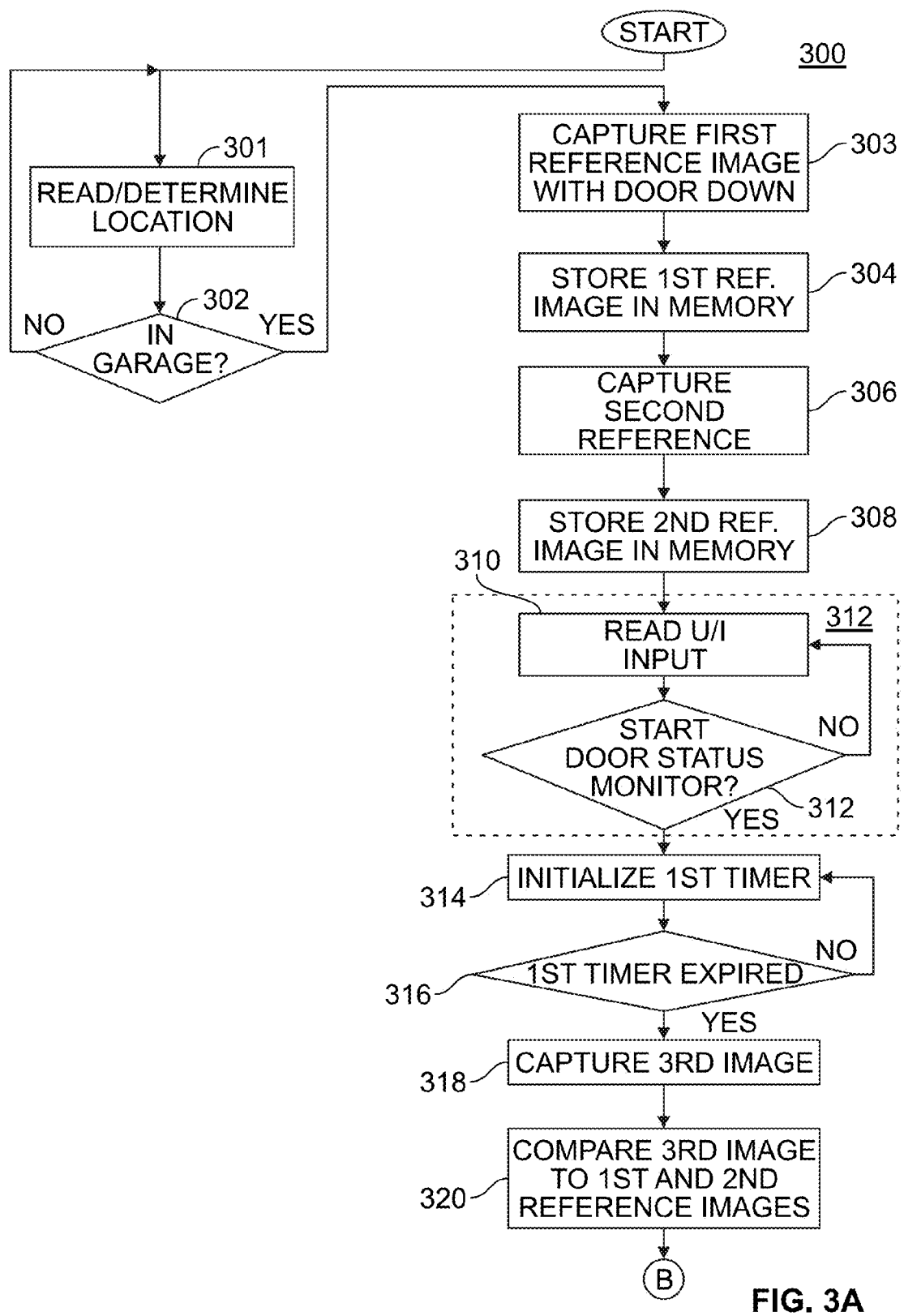
FIGS. 3A and 3B depict steps of a first method for determining whether a garage door is open or closed using a detector such as the one depicted in FIG. 1.
Figure 3B:
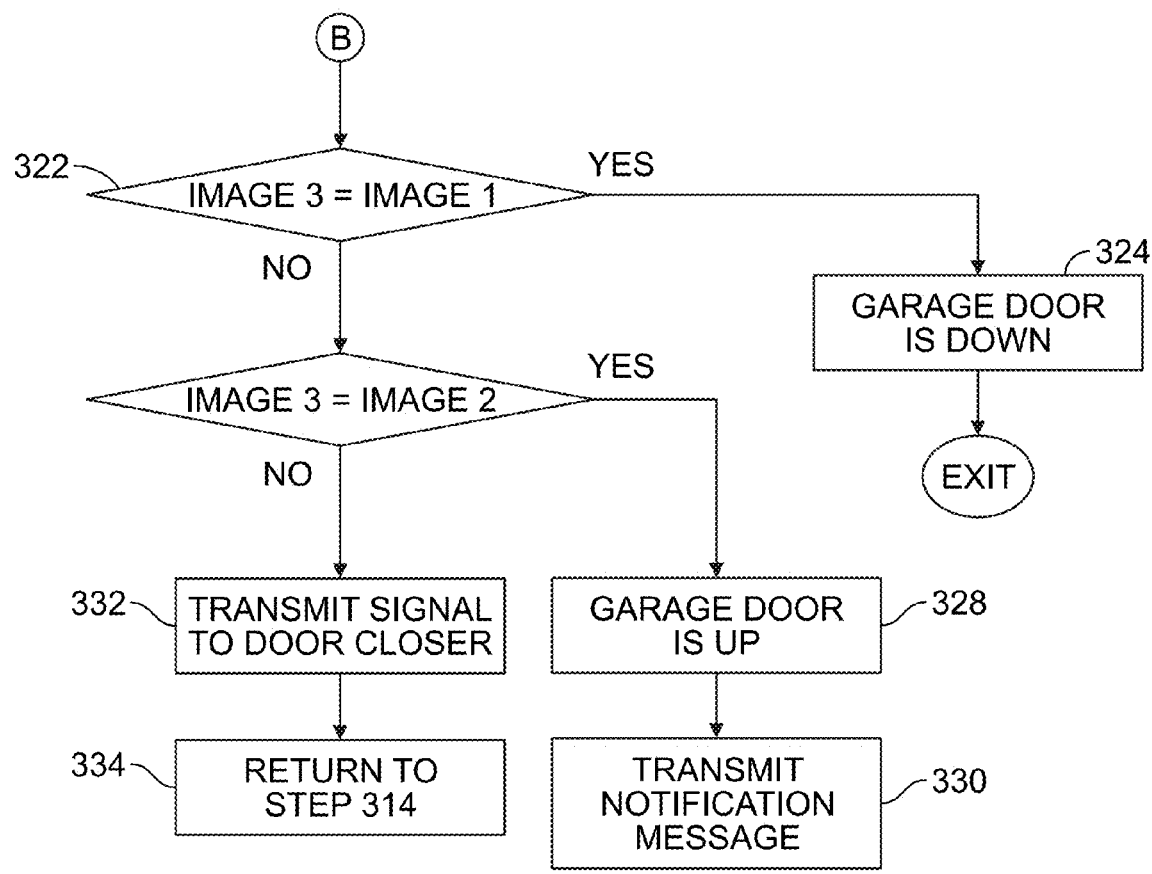

FIGS. 3A and 3B depict steps of a method 300 for determining whether the garage door 108 is "up" or open 112 using sensors/detectors depicted in FIG. 1 and FIG. 2. The method is performed by the processor 202 executing program instructions stored in the memory 204.

In a first step 301, the location of a vehicle is obtained from a location-determining device such as a global position system, a dead-reckoning navigation system or from a radio receiver that "hears" signals from either a cellular telephone network or "WI-FI" systems and triangulates a location.

At step 302, the location determined from step 301 is compared against a location where the vehicle would be if it is in a garage. If the results of the test at step 302 are positive, i.e., the vehicle is actually in a garage, the method proceeds to step 303, which takes place while the vehicle 104 is located inside of the garage 106.

In step 303, the processor 116 instructs or controls the rear parking sensor 102 to capture a first reference image, i.e., capture the field of view 114, when the garage door 108 is deliberately or intentionally located at its down position 110. At step 304, the first reference image is stored in the memory device 204 as a first reference frame.

At step 306, which takes place after the first reference frame is captured and stored, and after the garage door 108 is moved to its up position 112, the processor 116 instructs or controls the rear parking sensor 102 to capture a second reference frame, which is an image of the field of view 114 when the garage door 110 is in its up position 112. The second reference image of the field of view 114 is stored in the memory device 204 as a second reference frame.

After the first and second reference frames are stored in the memory device 204, the processor 116 can autonomously determine whether the garage door 108 is up 112 or down by the processor 116 instructing the rear parking sensor 102 to capture a third image of the field of view 114. Determining whether the garage door 108 is up 112 or down 110 can be made by pattern recognition, i.e., determining the presence or absence of one or more shapes in the third image. The door 108 can also be determined to be up 112 or down 110 by comparing pixels of the third captured image of the field of view 108 to corresponding pixels of one or both of the first and second reference frames.

At step 310, a loop 312 is entered during which the method 300 waits for a command from the user interface 212 to start monitoring the garage door. When a command to monitor the garage door is received, a first timer is initialized at set 314. The length of the first timer 314 is chosen to allow passengers of the vehicle to exit the vehicle and the garage before the garage door monitoring is begun. Garage door monitoring starts at the expiration of the timer as part of step 316.

At step 318, a third image is captured by the camera. At step 320 the third image is compared to the first two images successively.

The third image is compared to the first captured image at step 322. If the two images are the same or substantially the same, the garage door 108 is determined at step 324 to be down. The method 300 is thereafter terminated.

If the third captured image is not the same as the first captured image, a second text is performed at step 326 whereat the third image is compared to the second captured image. If the third image is the same or substantially the same as the second captured image, the door 108 is considered to be open at step 328. A door open notification message is transmitted at step 330.

If for some reason the third captured image is not at least substantially the same as the second captured images, the method 300 transmits a door close signal to the garage door closer at step 332. After the door closer is operated, the method returns to step 314 where the first timer is re-initialized and counted down before another image of the field of view is captured. Eventually the garage door 108 is detected to be up and a message is sent or the door is determined to be down.

In the first, preferred embodiment which uses a camera to detect a garage door, the garage door 110 is determined to be up 112 if the third image more closely or "substantially" matches the second reference image than it does the first reference image. In other words, the determination of whether the garage door 108 is up 112 or down 110 is made simply by determining which of the two reference images most closely conforms to or matches a third captured image.

Figure 4:
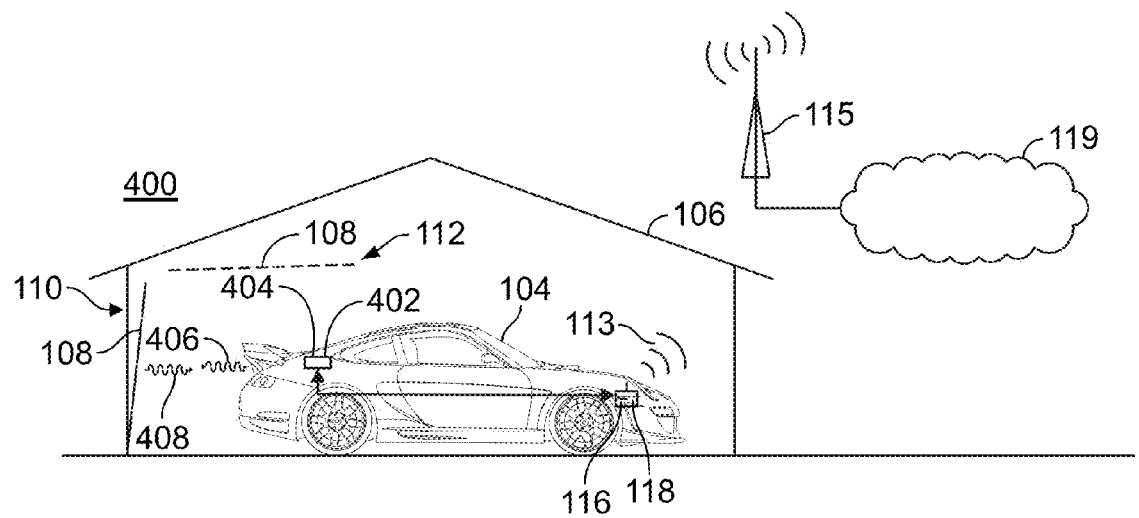
FIG. 4 depicts a second embodiment of garage door position detector.

Captured images are determined to be either substantially matched or substantially unmatched, i.e., similar or dissimilar, by comparing the two images or image frames on a pixel-by-pixel basis. Images can also be determined to be matched or similar by comparing groups or clusters of adjacent pixels in two different image frames. Images captured by the rear parking sensor 102 are thus considered herein to be signals that are used to indicate whether the door 108 is up 112 or down 110. When the door 108 is determined to be up 112 using the captured images, the processor 116 directs the wireless transmitter to transmit a message to either the vehicle owner, garage owner or some other person or entity, notifying them of the door's open status. Theft or loss protection measures can thereafter be taken. If the door 108 is not closed within a predetermined length of time, the detector is able to close the garage door 108 itself by transmitting an opener-actuating signal to the remotely-controlled garage door opener. The garage door opener is not shown. Such devices are well known, FIG. 4 depicts a second embodiment of garage door position detector 400. As with the first embodiment, the detector 400 shown in FIG. 4 is configured to repeatedly and/or continuously determine the location or status of a garage door 108, i.e., determine whether a garage door 108 is in its "up" or open 112 position. As with the first embodiment, the second embodiment is able to determine the status of any garage door for any garage.

If the door 108 is determined to be open 112, the garage door position detector 400 wirelessly transmits an open door notification message 113 to a predetermined person or entity, such as the vehicle's owner, the garage's owner or some other person or entity, notifying one or more of them that the door is open. The notification message 113 can be embodied as a text message, i.e., a data message or e-mail, or a pre-recorded audio message. The destination or address of the text message or e-mail can be specified in advance, i.e., the destination to which the message is sent can be predetermined. If the door 108 is not timely closed, i.e., closed within a predetermined number of minutes or hours after the notification message is sent, the detector 400 can close the garage door 108 itself by transmitting a door close signal to the door's opener.

In FIG. 4, the detector 400 comprises a laser 402 and a co-located light detector 404 attached to the motor vehicle 104. They are configured to measure distance between the laser and a surface or object such as a garage door 108 behind the vehicle by measuring the time between a light pulse's transmission and its reception.

Short-duration light pulses 406 are transmitted from the laser 402. In FIG. 4, the light pulses 406 are transmitted in a direction that is behind the vehicle. If a garage door 108 behind the vehicle is down or closed 110, transmitted pulses of light 406 will be reflected by the door 108 to form reflected light pulses 408 and thus detectable by the light detector 404 co-located with the laser 402, i.e., adjacent to the laser 402. When reflected light pulses 408 are detected by the detector 404, the door 108 is considered to be down or closed 110. The presence or absence of reflected light pulses 408 can thus be used to determine whether the door 108 is up 112 or down 110.

Light pulses that are detected impinge on a conventional photodiode, not shown, the output of which is a measurable electrical voltage comprising an output of the detector 404. Such an output, or lack thereof is generated responsive to the detection of reflected light pulses 408. Such an output, or lack thereof is therefore considered to be representative of the garage door being open or closed.

The method of determining whether a garage door is open shown in FIG. 3 can be easily modified to be used with the apparatus shown in FIG. 4. Instead of comparing images, as is required when the garage door location sensor is a camera, the method of FIG. 3 is modified to calculate or determine the distance between the laser and an object or surface that reflects the transmitted light pulses 406. It is well known that distance, D, is equal to rate (R) multiplied by time, (t). Since the speed of light is well known, the distance between the vehicle and the garage door can thus be calculated by measuring the time between transmission and reception of a light pulse. If the measured distance between the laser 402 and a light reflecting surface exceeds a predetermined maximum, the garage door 108 can be assumed to be open. A door open notification message can be sent. If such a message does not result in the garage door 108 being closed before the expiration of a maximum time, a door close signal can be transmitted to a garage door opener.

Figure 5:
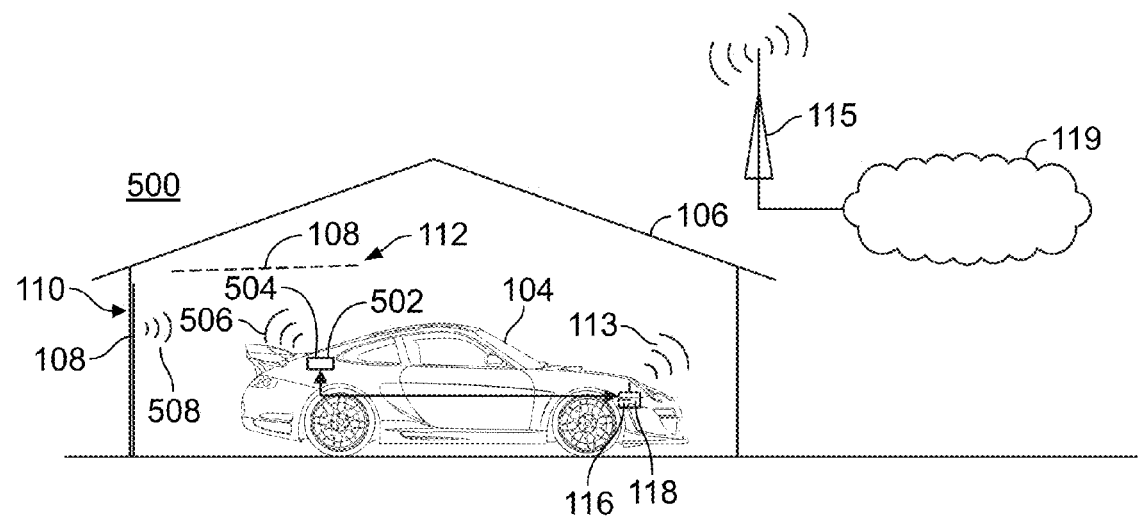
FIG. 5 depicts a third embodiment of garage door position detector.

FIG. 5 depicts a third embodiment of garage door position detector 500. As with the first embodiment, the detector 500 shown in FIG. 5 is configured to repeatedly and/or continuously determine the location or status of a garage door 108, i.e., determine whether a garage door 108 is in its "up" or open 112 position, by measuring distance between the vehicle and where the garage door should be located when it is down. Distance is measured ultrasonically. If the door 108 is determined to be open 112, the garage door position detector 400 wirelessly transmits an open door notification message to a predetermined entity, such as the vehicle's owner, the garage's owner or some other person or entity, notifying one or more of them that the door is open. As with the first two embodiments, the notification message 113 can be embodied as a text message, i.e., a data message or e-mail, or a pre-recorded audio message. The destination or address of the text message or e-mail can be specified in advance, i.e., be predetermined. If the door 108 is not timely closed, i.e., closed within a predetermined number of minutes or hours after the notification message is sent, the detector 400 can close the garage door 108 itself.

In FIG. 5, the detector 500 comprises an ultrasonic transmitter 502 and a co-located ultrasonic receiver 504 attached to the motor vehicle 104. Similar to the second embodiment, which measures distance using light pulses, the ultrasonic transducers 502 and 504 measure distance between themselves and a surface or object such as a garage door 108 using transmitted ultrasonic sound waves 510 and reflected ultrasonic sound waves 512.

Short duration ultrasonic sound pulses 510 are transmitted from the ultrasonic transmitter 502. If a garage 108 door 108 is down or closed 110, transmitted pulses of ultrasonic sound 510 will be reflected by the door 108 to form reflected sound waves 512. The reflected sound waves 512 are detectable by the ultrasonic receiver 504, which is co-located with the ultrasonic transmitter 502. When reflected sound waves 512 are detected by the ultrasonic receiver 504, the door 108 is considered to be down or closed 110. The presence or absence of reflected sound waves or pulses 512 can thus be used to determine whether the door 108 is up 112 or down 110. A signal that is output of the ultrasonic receiver 504, which is output responsive to the detection of reflected sound waves 512, or a lack thereof, is considered herein to be representative of the garage door being open or closed.

Figure 6:
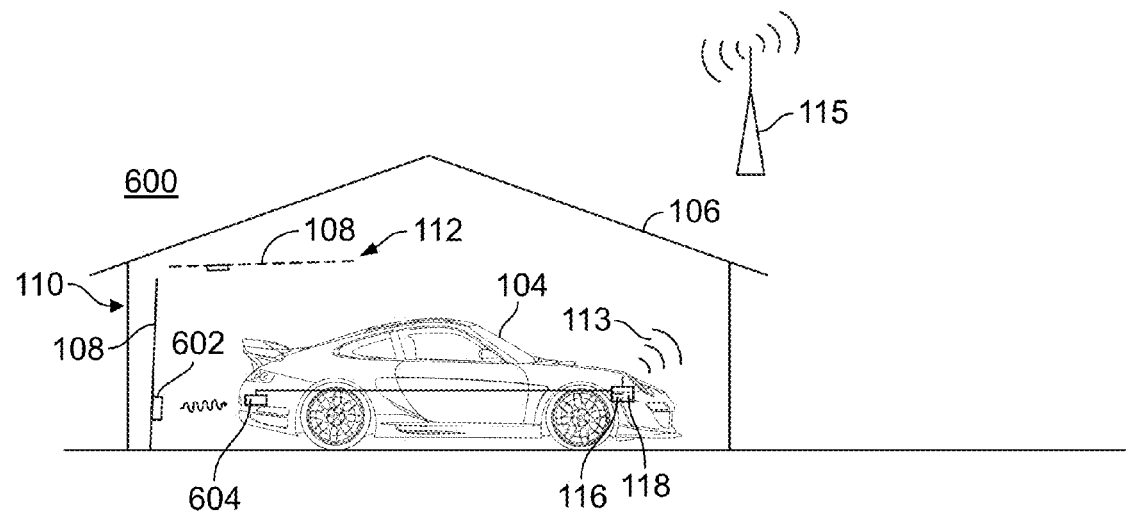
FIG. 6 depicts a fourth embodiment of garage door position detector.

FIG. 6 depicts a fourth embodiment of garage door position detector 600. As with the first three embodiments described above, the detector 600 shown in FIG. 6 is configured to repeatedly and/or continuously determine the location or status of a garage door 108, i.e., determine whether a garage door 108 is in its "up" or open 112 position, by the presence or absence of an RFID tag affixed to the garage door. If the door 108 is determined to be open 112, the garage door position detector 600 wirelessly transmits an open door notification message to a predetermined entity, such as the vehicle's owner, the garage's owner or some other person or entity, notifying one or more of them that the door is open. As with the first two embodiments, the notification message 113 can be embodied as a text message, i.e., a data message or e-mail, or a pre-recorded audio message. The destination or address of the text message or e-mail can be specified in advance, i.e., be predetermined. If the door 108 is not timely closed, i.e., closed within a predetermined number of minutes or hours after the notification message is sent, the detector 600 can close the garage door 108 itself.

In FIG. 6, the detector 600 comprises a radio frequency identification (RFID) tag 602 attached to the garage door and a RFID detector 604 attached to the motor vehicle 104 at a location where the detector 604 is able to sense the tag 602 when the 108 is in its down position 110. The controller 116 periodically sends a signal to the detector 604 that instructs the detector 604 to interrogate its surroundings for the presence of a particular RFID tag 602 attached to the door 108. If such an RFID tag 602 is sensed, the detector 604 responds to the controller's query by way of a signal indicating that the tag 602 was detected. The output signal from the detector 604, not shown but well known to those of ordinary skill in the art, thus comprises a signal that is indicative of, and responsive to, the door 108 being up 112 or down 110.

Figure 7:
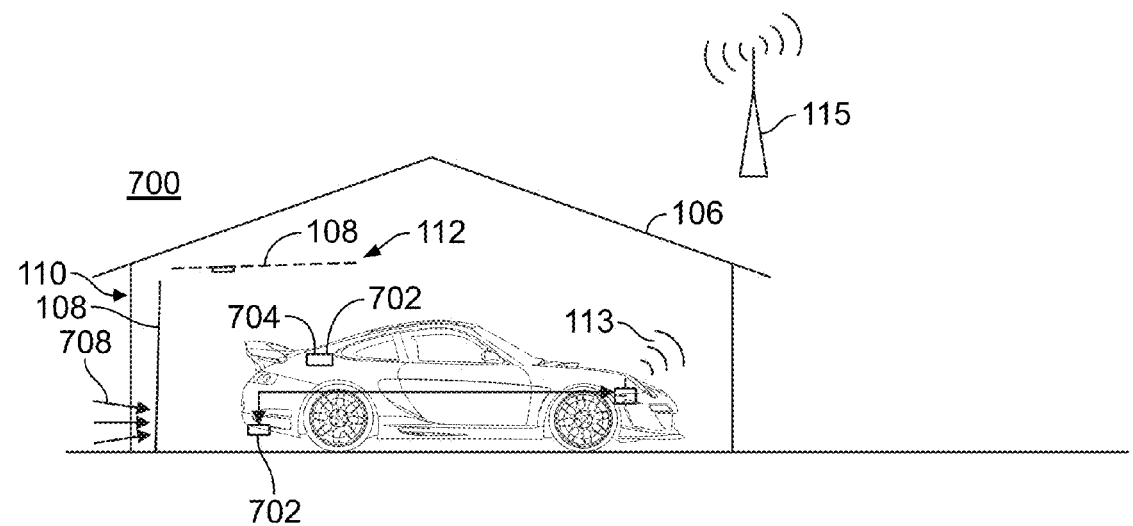
FIG. 7 depicts a fifth embodiment of garage door position detector.

Finally, FIG. 7 depicts a fifth embodiment of garage door position detector 700. As with the first three embodiments described above, the detector 700 shown in FIG. 7 is configured to repeatedly and/or continuously determine the location or status of a garage door 108, i.e., determine whether a garage door 108 is in its "up" or open 112 position, by measuring ambient light levels. If the door 108 is determined to be open 112, the garage door position detector 700 wirelessly transmits an open door notification message 113 to a predetermined entity, such as the vehicle's owner, the garage's owner or some other person or entity, notifying one or more of them that the door is open. As with the other embodiments, the notification message 113 can be embodied as a text message, i.e., a data message or e-mail, or a pre-recorded audio message transmitted on a radio frequency signal, an audio frequency signal or light wave. The destination or address of the text message or e-mail can be specified in advance, i.e., be predetermined. If the door 108 is not timely closed, i.e., closed within a predetermined number of minutes or hours after the notification message is sent, the detector 600 can close the garage door 108 itself.

In FIG. 7, the detector 700 comprises an ambient light detector 702 attached to at least the rear window 704 or rear bumper 706 of the vehicle 104. The light detector 702 comprises a conventional photodiode, not shown, which outputs a measurable electrical signal that corresponds to the level and frequencies of light waves 708 that impinge on the photodiode when the door 108 is up or open 112. Ambient light 708 that is present at various different times of the day and which are detected by the light detector 702 can thus be used to determine whether the door 108 is in its up position 112 or down position 110.

Detecting a garage door's position using ambient light 708 is preferably accomplished by measuring and recording a first ambient light level with the garage door closed. A second ambient level is measured and recorded with the garage door open. After the open and closed light levels are measured and recorded, subsequently measured light levels are compared to the first and second levels. A subsequently-measured light level that corresponds more closely to one of the first two levels can be considered to be the ambient level caused by the door being open or closed.

The signal from the light detector 702 corresponding to a measured, ambient light lever, or a lack thereof, is sent to the processor 116. It is a signal responsive to and indicative of the position of the door 108. When the processor 116 determines whether a garage door 108 is open or closed, the processor 116 subsequently decides whether to cause the transmission of an open door notification message 113.

In yet another embodiment, the detector comprises a conventional microphone configured to detect sound levels outside the vehicle 104. Detecting the up or down location of garage door using sound can be accomplished by measuring and recording a first ambient noise level (ambient with respect to the vehicle 104 when it is inside the garage 108) with the garage door closed. A second ambient noise level is measured and recorded with the garage door open. After the two different noise levels are measured and recorded, subsequently determining whether the garage door is open or closed can be accomplished by comparing the first and second ambient noise levels to subsequently measured ambient noise levels.

When ambient noise levels are detected to be near one of the two measured and stored noise levels, the processor 116 to which the microphone is connected, determines the door 108 to be in its open position 112 or closed position 110 accordingly. Upon making such a determination, the processor 116 causes the transceiver 118 to send a door open notification message 113.

A camera, laser, laser light detector, ultrasonic sound detector, RFID detector, ambient light detector and microphone are different embodiments of sensors that generate or output measurable electrical signals responsive to corresponding physical conditions. Each of them thus able to detect a corresponding physical condition that indicates whether a garage door is open or closed. Since they are able to detect a garage door, they are therefore able to detect objects in front of a vehicle or behind a vehicle and are thus considered herein to be parking sensors.

As described above, each of the various sensors is coupled to and operates under the direction and control of a processor 116. Each of them is able to detect corresponding conditions the existence or non-existence of which will indicate whether the garage door is open or closed or whether an object or surface is within a predetermined distance of them or the vehicle. Electrical signals they generate are evaluated by a processor 116, which executes program instructions that are stored in a non-volatile and non-transitory memory device.

The processor 116, which controls the sensors and evaluates their output signals, is preferably co-located with or forms part of a wireless transceiver 118 from which a message 113 can be transmitted when a sensor detects a physical condition indicative of the door 108 being open or in its up position 112 or when a sensor detects an object, such as a garage wall or other object in front or behind the vehicle 104.

The transceiver 118 is preferably capable of transmitting on one or more cellular frequency bands as well as the frequency bands commonly used by remotely controlled garage door openers. The transceiver 118 is thus able to transmit a data message or wirelessly send an e-mail message to the address of a person or organization that might be able to close the door 108. The transceiver can also optionally transmit a second message 115 directly to a garage door opener that will cause the opener to close the door 108.

FIGS. 8-12 illustrate steps of a method of determining whether a vehicle is parked in a garage and whether the overhead garage door is open. FIGS. 13A and 13B are first and second parts of a flow chart depiction of the same method. The steps of the method 1300 are performed by the CPU 202 executing program instructions that are stored in memory 204 and which cause the processor to control various sensors and evaluate information obtained from the sensors.

Figure 8:
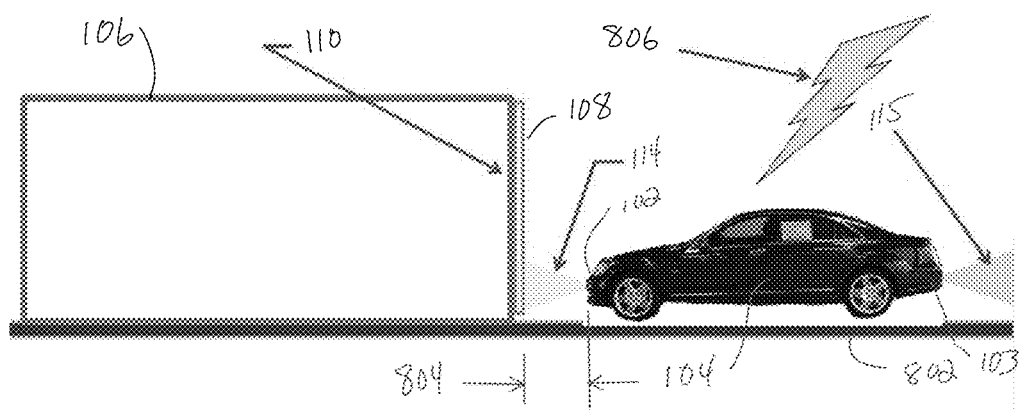
FIGS. 8-11 graphically depict a second method of determining whether a garage door is open or closed.

As can be seen in FIG. 8 and as shown in step 1302 in FIG. 13A, a vehicle 104 is initially parked outside the garage 106, on a portion of a driveway 802 in front of, and in relatively close proximity to (6-20 feet) the overhead door 108 of the garage 106, which is closed. The CPU 202 depicted in FIG. 2 executes program instructions which cause the CPU to retrieve information from the front and back parking sensors 102 and 103. Information obtained by the CPU 202 from the front sensor 102 establishes a baseline distance 804 to the closed garage door 108, i.e., a garage door in the down position 110. The CPU 202 stores that distance in memory 204.

While the vehicle is parked in front of the garage 106, the CPU 202 obtains geographic coordinates from the location determining device 213 that identify where the vehicle 104 is located relative to the location of the garage 106. The geographic location of the garage 106 is of course known in advance and also stored in memory 204. The rear parking sensor 103, which has a limited range of detection of less than about twenty feet to the rear of the vehicle, does not detect an object near the rear of the vehicle 104.

Figure 9:
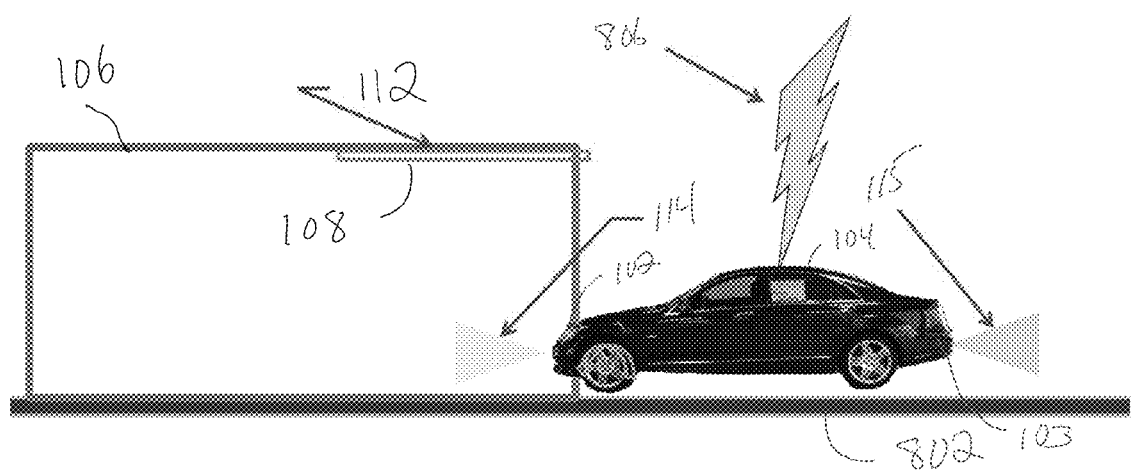

Referring now to FIG. 9 and step 1304 in FIG. 13A, the garage door 108 is opened by a user, i.e., moved to its open position 112, before the vehicle 104 is slowly rolled toward and into the garage 106. As the vehicle 104 rolls forward, the CPU 202 obtains wheel rotation information from the wheel sensor 215. Stated another way, the wheel sensor 215 counts the front (or rear) wheel rotations. The CPU 202 determines how far the vehicle 104 has travelled from the starting location shown in FIG. 8, which is outside the garage 106, by multiplying the known-in-advance tire diameter by the number of wheel rotations.

As the vehicle 104 rolls forwardly and into the garage 106, the location determining device 215 continues to retrieve GPS coordinates. The location determining device 215 also identifies the order by which GPS satellite signals disappear or are lost.

Figure 10:
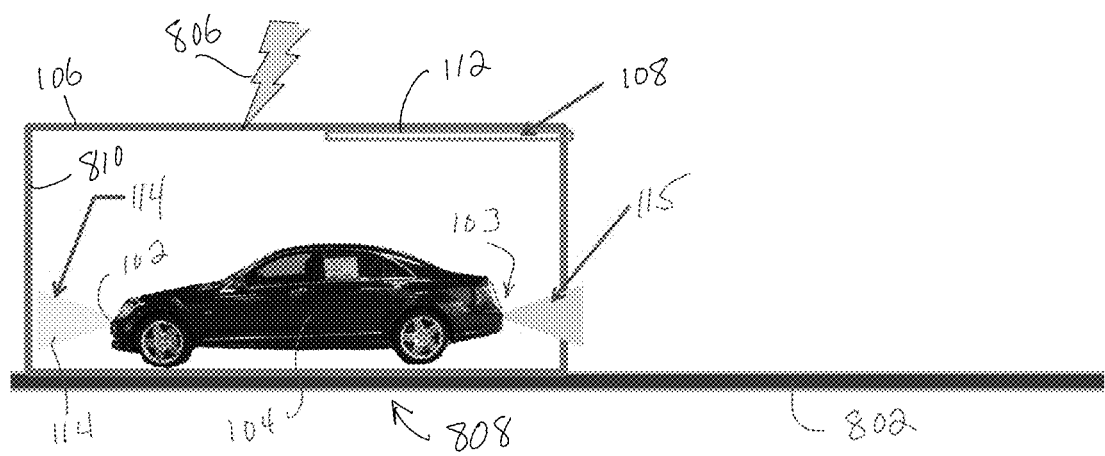

As shown in FIG. 10 and step 1306 of FIG. 13A, the vehicle 104 is eventually moved to a user-preferred location 808 in the garage 106. The vehicle 104 movement is stopped and its transmission placed into a "park" position. After the vehicle 104 has been moved to a preferred location 808, the CPU 202 retrieves distance measurements from the front parking sensor 102 and from the back parking sensor 103 with the garage door 108 in the open position 112, i.e., a measurement of the distance between the sensor and an object.

When the garage door 106 is in the open position 112, the CPU 202 obtains a reading of the distance between the wall 810 of the garage 106 and the front of the vehicle 104. Since the rear parking sensor 103 is not able to detect objects more than about twenty feet behind the vehicle, it will not show or detect an object or obstruction behind the vehicle 104 because the door 106 is open 112.

The location determining device 213 continues to monitor GPS signals 806 and identify the order to which signals from the GPS satellites can no longer be tracked.

Figure 11:
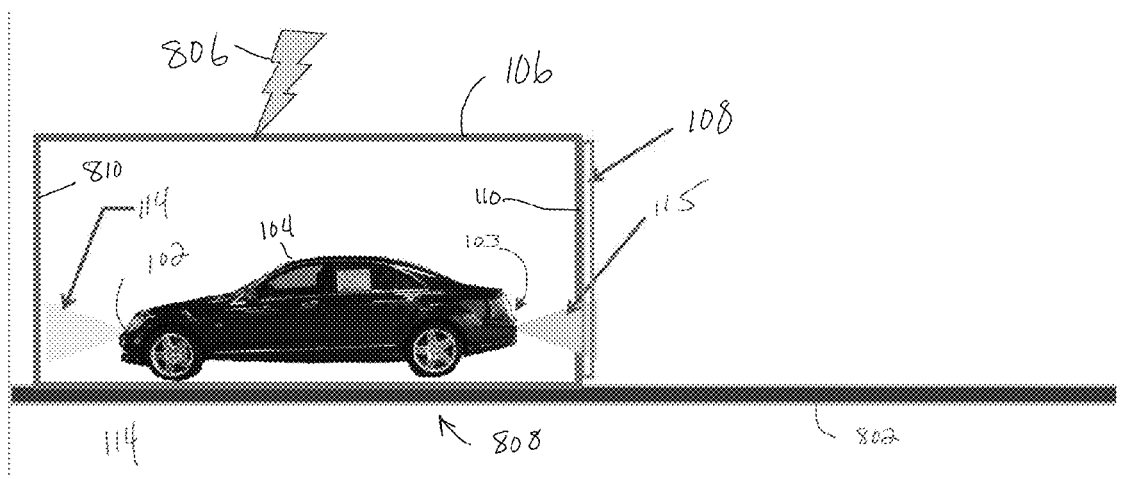

In FIG. 11 and at step 1308, the garage door 108 is closed by a user. The CPU 202 obtains another reading from both parking sensors 102, 103. The information obtained from the front parking sensor 102 is used to confirm that the vehicle's position 808 did not change during the course of closing the garage door 108.

When a second reading is obtained from the rear parking sensor 103 with the overhead door 106 down or closed, the rear parking sensor 103 provides a distance to the closed garage door 106. The CPU 202 thus "determines" the position 808 in the garage 106 relative to the front wall 810 and garage door 106 as being a nominal, closed garage door position for the vehicle 104 in the garage 106.

Figure 12:
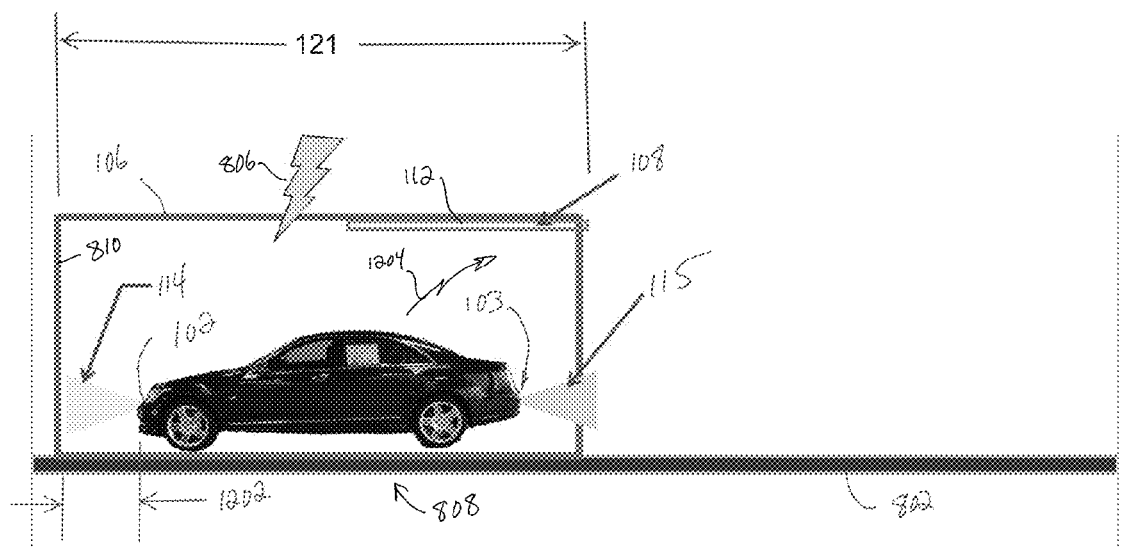
FIG. 12 depicts determining whether the overhead door was left open.
Figure 13A:
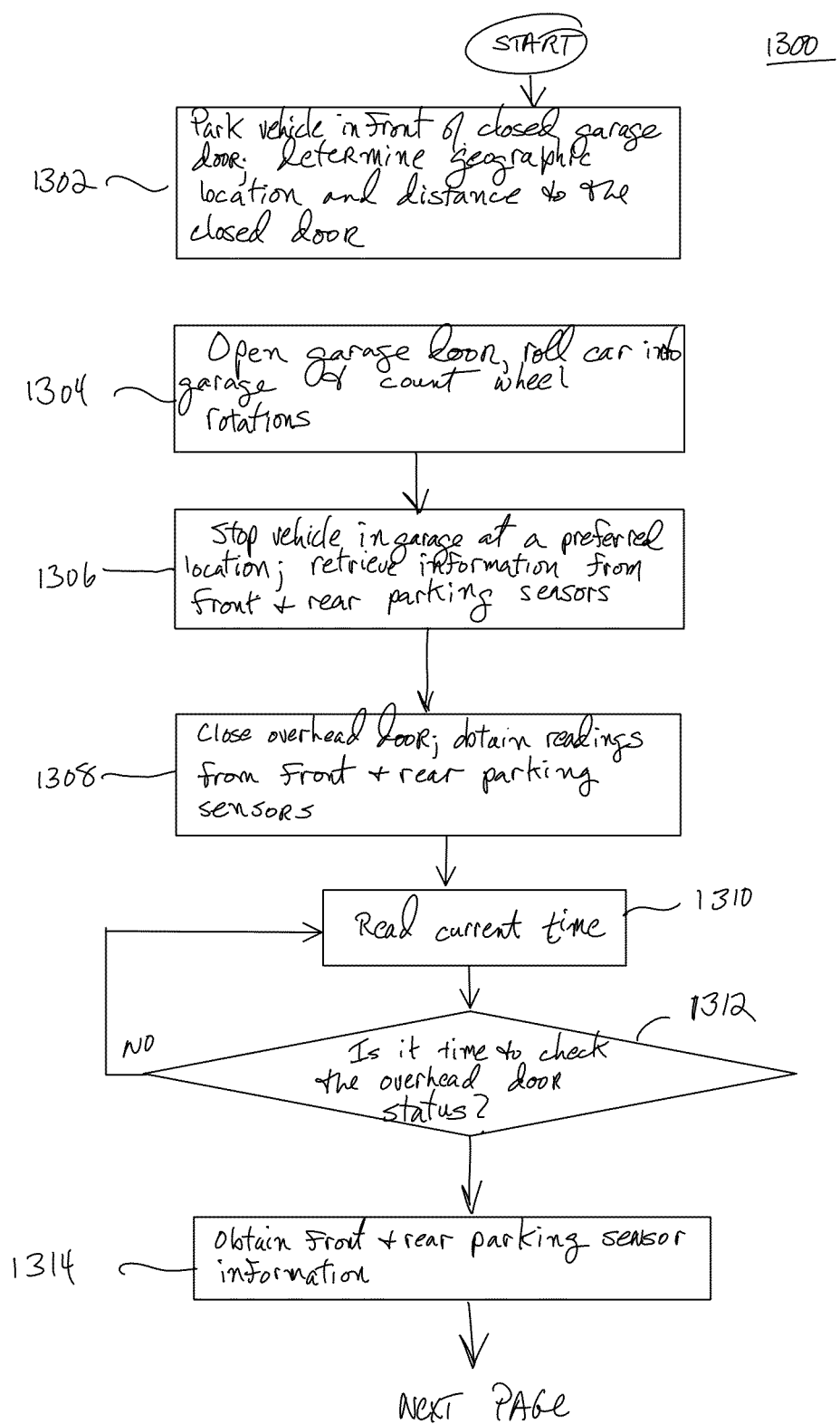
FIGS. 13A and 13B are first and second parts of a flow chart depicting the steps shown in FIGS. 8-11.
Figure 13B:
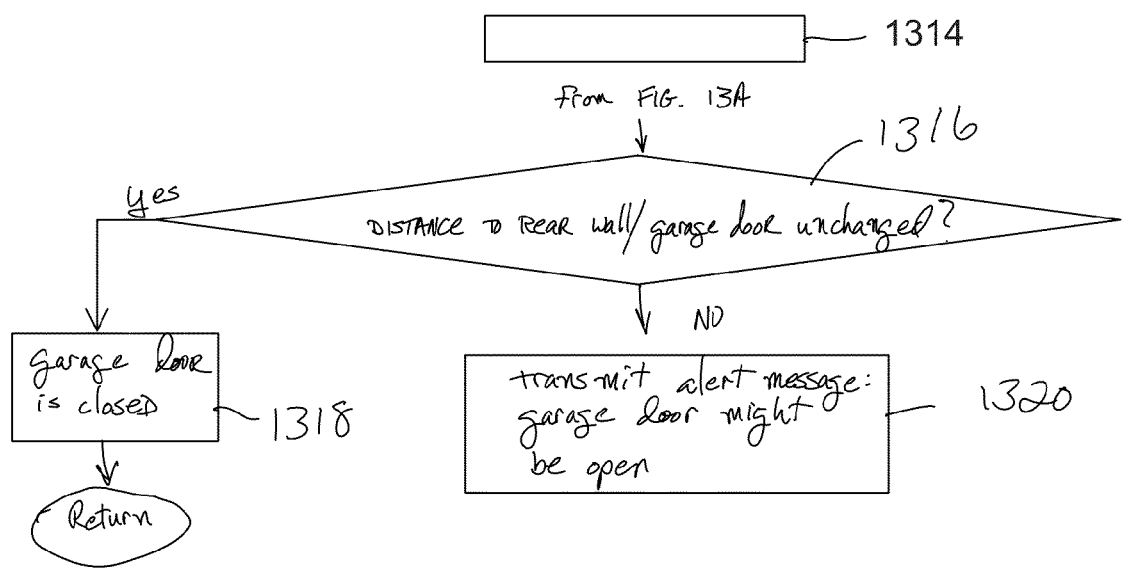

Determining whether the overhead door 106 was left open and providing an alarm or alert message thereof is illustrated in FIG. 12 and shown in step 1320 of FIG. 13B.

At steps 1310 and 1312, the method 1300 waits until a predetermined time of day to check the status of the overhead door 106.

Step 1314 is performed at a pre-determined time of day, i.e., a time of day that is user-specified or specified in advance, the CPU 202 obtains measurements from the front and rear parking sensors 102, 103 respectively. A determination is made at step 1316 whether the distance to an object behind the vehicle, i.e., the garage door 106, has not changed.

If the vehicle 104 has not moved since it was parked, the front parking sensor 102 will indicate that the vehicle-to-front wall distance 1202, i.e., the distance from the front of the vehicle 104 to the garage wall 810 has not changed or is at least substantially the same. Similarly, the rear parking sensor 103 will indicate that the distance to an obstruction behind the vehicle has not changed. The method proceeds to step 1318 where no action is taken.

As noted above, the parking sensors 102, 103 are configured to be able to detect objects within a limited range or distance of the vehicle 104. If no object is detected within that range, the instructions that control the CPU are configured to consider the space "in front of" a sensor as being open or unoccupied.

If at step 1316, the rear parking sensor 103 cannot detect an object behind the vehicle, an assumption is made by the program instructions that the overhead garage door 106 is open. The method thus proceeds to step 1320 whereat an alert message is transmitted from the transceiver 208. In other words, the CPU 202 causes the transceiver to issue or transmit an alert message 1204, such as a text message or an e-mail to an appropriate entity.

As noted above, steps of the method depicted in FIGS. 8-12 and in FIGS. 13A and 13B are performed by the CPU 202 when it executes program instructions stored in non-transitory memory device 204. In a preferred embodiment, the CPU 202 also causes the overhead door opener transmitter 210 to issue a signal to an automatic garage door opener that will activate the door opener, i.e., cause the door 106 to be closed.

The foregoing description is for purposes of illustration only. The true scope of the invention is set forth in the following claims.

What is claimed is:

1. An apparatus for determining whether a vehicle is in a garage and determining whether an overhead garage door is open or closed, the apparatus comprising:
    a processor;
    a first parking sensor coupled to the processor, configured to determine a distance between a first end of the vehicle and a first object;
    a second parking sensor coupled to the processor, configured to determine a distance between a second end of the vehicle and a second object;
    a wireless transmitter coupled to the processor, configured to wirelessly transmit a message responsive to a signal received from the processor;
    a geographic location determiner coupled to the processor and configured to determine a geographic location of the vehicle;
    a wheel sensor coupled to the processor, configured to count rotations of a vehicle wheel;
    a non-transitory memory device coupled to the processor and storing program instructions for the processor, which when executed cause the processor to:
        determine a geographic location of the vehicle relative to the garage;
        determine whether the vehicle is inside the garage from a count of wheel rotations and the determined geographic location;
        determine a first distance between a first end of the vehicle and a garage wall when the vehicle is parked in the garage;
        determine a second distance between a second end of the vehicle and the garage door when the overhead garage door is known to be closed;
        at a first pre-determined time after determining the second distance, determine a third distance between the first end of the vehicle and the garage wall;
        after determining the third distance, determining a fourth distance between the second end of the vehicle and the garage door when the door is known to be closed;
        if the third distance is substantially equal to the first distance and if the fourth distance is substantially greater than the second distance, said program instructions cause the processor to control the wireless transmitter to transmit a garage door open message.

2. The apparatus of claim 1, wherein the wireless transmitter is a cellular telephone.

3. The apparatus of claim 1, further comprising a garage door opener transmitter operatively coupled to the processor.

4. The apparatus of claim 3, wherein the program instructions additionally cause the processor to control the garage door opener transmitter to transmit a signal to the garage door opener after determining the garage door as being open.

5. The garage door position detector of claim 1, wherein the first and second parking sensors are first and second cameras.

6. The garage door position detector of claim 1, wherein the first and second parking sensors are first and second ultrasonic transducers.

7. The garage door position detector of claim 1, wherein the first and second parking sensors are first and second laser detectors.

8. A method of detecting an overhead garage door being open, the method comprising:
    determining whether a vehicle is inside a garage having an overhead garage door using front and rear parking sensors attached to the vehicle and a wheel sensor, wherein the step of determining whether a vehicle is inside a garage comprises:
        determining a first geographic location of the vehicle when the vehicle is parked in front of the overhead garage door;
        after the geographic location of the vehicle has been determined, driving the vehicle toward a second location in the garage while counting the number of wheel rotations;

determining a distance travelled by the vehicle from the first location to the second location from the number of wheel rotations;

determining whether the distance travelled from the first location to the second location locates the vehicle in the garage;

after the vehicle is determined to be inside the garage, detecting whether the garage door is open or closed using at least one of the front and rear parking sensors;

wirelessly transmitting an alert message, indicating that the garage door is open, responsive to detecting the garage door to be open.

9. The method of claim 8, wherein the step of detecting whether the garage door is open or closed comprises:

detecting a first distance between a first end of a vehicle and garage door when the garage door is closed using at least one of the front and rear parking sensors;

at a later time, detecting a second distance between the first end of the vehicle and the garage door using at least one of the front and rear parking sensors;

comparing the first distance to the second distance and determining a difference between them; and determining the garage door to be open or closed based on the result of the comparing step.

10. The method of claim 8, further comprising:

closing the overhead garage door by transmitting a message to a garage door opener, upon the determination that the overhead garage door is open.

* * * * *